L. I., M. W., AND L. H. IVERSON.
WIRE HANDLING MACHINE.
APPLICATION FILED AUG. 17, 1921.
1,418,575.                                             Patented June 6, 1922.
                                                           2 SHEETS—SHEET 1.
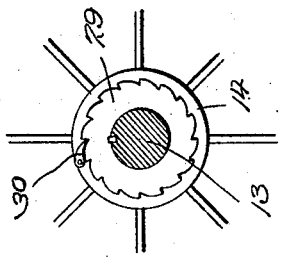
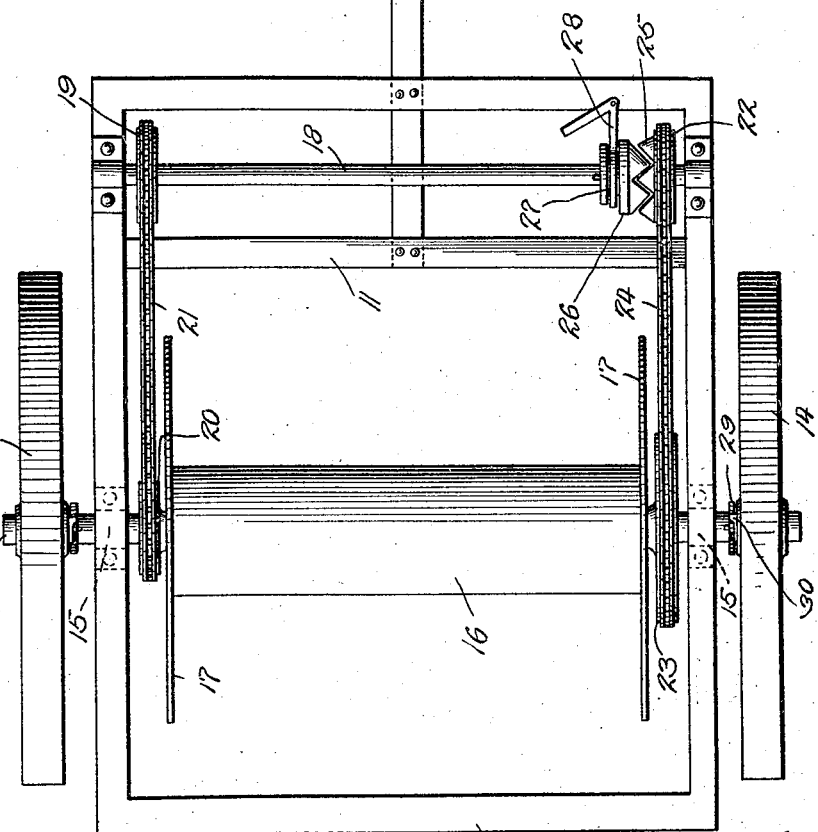
Inventors.
Lester I. Iverson
Myron W. Iverson
Leon H. Iverson
Watson E. Coleman
Attorney.

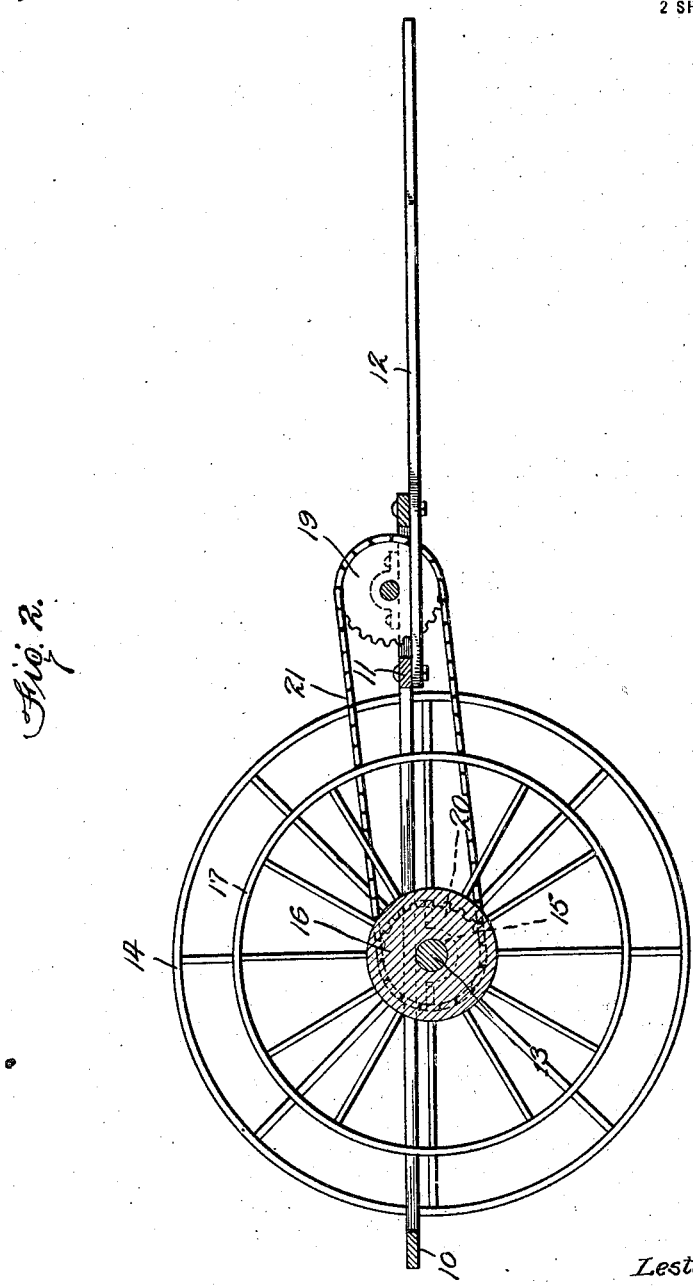

UNITED STATES PATENT OFFICE.

LESTER I. IVERSON, MYRON W. IVERSON, AND LEON H. IVERSON, OF PENALOSA, KANSAS.

WIRE-HANDLING MACHINE.

1,418,375.

Specification of Letters Patent.   Patented June 6, 1922.

Application filed August 17, 1921. Serial No. 492,968.

*To all whom it may concern:*

Be it known that we, LESTER I. IVERSON, MYRON W. IVERSON, and LEON H. IVERSON, citizens of the United States, residing at Penalosa, in the county of Kingman and State of Kansas, have invented certain new and useful Improvements in Wire-Handling Machines, of which the following is a specification, reference being had to the accompanying drawings.

This invention relates to wire handling machines for handling fence wire, either barbed or smooth, and more particularly to a machine of this kind in the nature of a reel upon which the wire is adapted to be wound or from which it is adapted to be unwound.

The general object of this invention is to provide a construction of this character which is particularly adapted for use in building fences and which provides for an easy and rapid method of handling wire.

A further object is to provide a construction of this character embodying a traction wheel supported frame and a tongue whereby the frame may be drawn, and a reel with means whereby the reel may be either rotated by power taken from the traction wheels or, if desired, rotated by hand in either direction or rotated to unwind the wire therefrom by the pull of the wire.

Other objects will appear in the course of the following description.

Our invention is illustrated in the accompanying drawings, wherein:—

Figure 1 is a top plan view of a winding machine constructed in accordance with our invention;

Figure 2 is a longitudinal sectional view of the machine;

Figure 3 is a fragmentary section through the axle showing the pawl and ratchet mechanism.

Referring to these drawings, 10 designates a supporting frame having the front cross bar 11 from which extends a tongue 12. The frame is supported on a transverse axle 13, upon which the traction wheels 14 are mounted. This axle 13 is supported in suitable bearings 15 on the frame. Rotatably mounted upon the axle for free rotation therearound is a roller 16 constituting a reel and provided with relatively large end disks 17 to prevent the wire from slipping off the reel.

Mounted parallel to the axle 13 is a shaft 18 which is mounted in suitable bearings and carries upon one end the sprocket wheel 19. One end of the roller or reel 16 carries upon it a sprocket wheel 20 and a sprocket chain 21 passes from the sprocket wheel 19 over the sprocket wheel 20. Mounted upon the axle 13 for rotation therewith is a sprocket wheel 23, and loosely mounted upon the shaft 18 is a sprocket wheel 22, these sprocket wheels 22 and 23 being connected by a sprocket chain 24. The sprocket wheel 22 is formed with clutch teeth 25, and mounted upon the shaft 18 for rotative engagement therewith but sliding thereon is a confronting clutch member 26. This is formed with the annular channel 27, within which the fork of a lever 28 engages so that the clutch member may be shifted longitudinally upon the shaft 18 into or out of engagement with the clutch member 25. As before remarked, the clutch member 27 rotates with the shaft 18 but the clutch member constituted by the sprocket wheel 22 is loose on the shaft 18.

It will be obvious that when power is transmitted from the traction wheels to the axle 13 that power will be transmitted by the chain 24 to the idler sprocket 22 and that if the clutch member 28 be thrown into engagement with the idler 22, the shaft 18 will be rotated and this, through the sprocket chain 21, will rotate the reel. If, on the other hand, the clutch is thrown out, then the reel will either stand still or may be rotated by hand applied to the disks 17 or otherwise. Preferably the sprocket wheel 23 has a diameter twice that of the sprocket wheels 22 and 19 so that the reel 16 will rotate twice as fast as the axle 13.

It will be noted that the middle portion of the reel is entirely unobstructed both in front and rear of the machine. It will be seen that with this device the spool or reel may be turned either forward or backward to wind up or unwind the wire. To unwind the wire, the machine is moved forward with the clutch thrown out and one end of the wire fastened to a post. This causes the spool to turn backward, which unwinds the wire. If it is desired to wind up the wire, the machine goes forward with the clutch thrown in, which causes the rotation of the spool to wind up the wire thereon. The spool, of course, may be turned by hand if desired either to wind up or unwind the wire. Preferably the traction wheels are engaged with the axle by means of a pawl and ratchet connection so that any backward movement of the frame will not reverse the motion of the spool. We have illustrated the ratchet 29 as mounted upon the axle and the hub of the wheel 14 as being provided with a pawl or pawls 30 to engage the ratchet.

We claim:—

1. A wire handling machine comprising a supporting frame, an axle, traction wheels mounted on the axle to rotate therewith, a reel loosely mounted upon the axle and having a sprocket wheel at one end, a countershaft mounted on the frame and having a sprocket wheel, a chain connecting the two sprocket wheels, a sprocket wheel loosely mounted upon the opposite end of the countershaft, a sprocket wheel on the axle, a chain connecting said last named sprocket wheels, and a clutch member shiftably mounted upon the countershaft and rotating therewith and shiftable into or out of engagement with the last sprocket wheel on said countershaft.

2. A wire handling mechanism of the character described comprising a supporting frame, a rotatable axle thereon, traction wheels engaging the axle and rotating therewith, means between the traction wheels and the axle for causing a unitary rotation of the axle and wheels in one direction but permitting the free rotation of the wheels in the opposite direction, a reel loosely mounted upon the axle concentric thereto and having a sprocket wheel at one end, a countershaft mounted upon the forward portion of the frame, a sprocket wheel operatively engaged with the said sprocket wheel of the reel, a sprocket wheel loosely mounted upon the opposite end of the countershaft, a sprocket wheel on the axle with means connected with a sprocket chain engaging the last named sprocket wheels, the loose sprocket wheel on the countershaft being formed with clutch teeth, and a sliding clutch mounted upon the countershaft and rotating therewith and having clutch teeth adapted to mesh with the first named clutch teeth, and a lever for shifting said clutch member toward or from the loose sprocket wheel, the sprocket wheel on the axle having a diameter greater than the diameter of the sprocket wheel on the countershaft or on the reel.

In testimony whereof we hereunto affix our signatures.

LESTER I. IVERSON.
MYRON W. IVERSON.
LEON H. IVERSON.